United States Patent [19]

Fukushima et al.

[11] Patent Number: 4,610,420
[45] Date of Patent: Sep. 9, 1986

[54] APPARATUS FOR MOUNTING POWER UNIT

[75] Inventors: Masao Fukushima; Shin Takehara, both of Machida, Japan

[73] Assignee: Nissan Motor Company, Limited, Yokohama, Japan

[21] Appl. No.: 702,191

[22] Filed: Feb. 15, 1985

[30] Foreign Application Priority Data

Feb. 16, 1984 [JP] Japan .................................. 59-26033
Feb. 20, 1984 [JP] Japan .................................. 59-28717

[51] Int. Cl.⁴ ............................................ F16M 13/00
[52] U.S. Cl. .................................... 248/550; 180/300; 248/659
[58] Field of Search ............... 248/550, 559, 563, 638, 248/659, 636, 562, 563; 180/300; 188/267, 378, 379, 380; 267/140.1, 35, 113, 122

[56] References Cited

U.S. PATENT DOCUMENTS

| 4,351,515 | 9/1982 | Yoshida | 248/562 X |
| 4,406,344 | 9/1983 | Fukushima | 248/559 X |
| 4,428,569 | 1/1984 | Takei | 267/140.1 |
| 4,440,375 | 4/1984 | Fukushima | 248/559 |
| 4,445,662 | 5/1984 | Fukushima | 248/559 |
| 4,456,213 | 6/1984 | Fukushima | 248/559 |
| 4,537,275 | 8/1985 | Kimura | 180/300 |

FOREIGN PATENT DOCUMENTS

| 3125040 | 3/1983 | Fed. Rep. of Germany | 188/380 |
| 198122 | 12/1982 | Japan | 180/300 |
| 199220 | 11/1983 | Japan | 180/300 |

Primary Examiner—J. Franklin Foss
Attorney, Agent, or Firm—Schwartz, Jeffery, Schwaab, Mack, Blumenthal & Evans

[57] ABSTRACT

A mounting apparatus for a power unit comprises a first elastic member comprising a rubber-like elastic member and a second elastic member comprising rubber-like elastic members and a mass member therebetween. The first and second elastic members are disposed in parallel, wherein the weight of mass member can be changed or the second elastic member can be functionally engaged and disengaged with the first elastic member so that the reduction of the spring constant or oscillation transmitting rate is obtained just above the resonant frequency of the second elastic member while the degrading of the oscillation transmitting can be prevented below the resonant frequency.

14 Claims, 18 Drawing Figures

FIG. 8
(d) 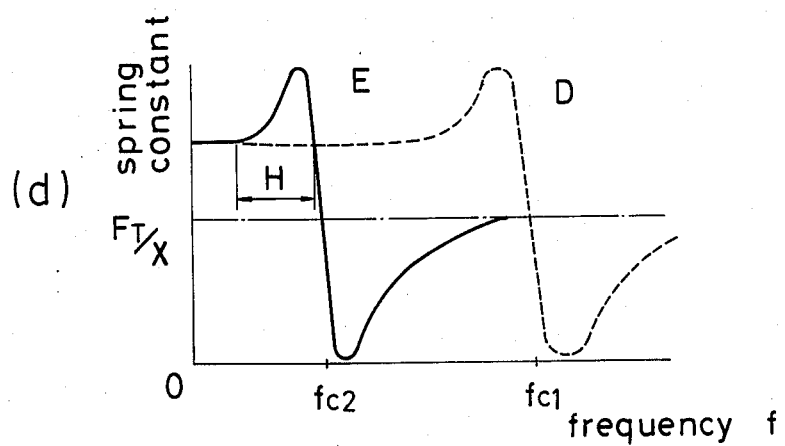
(e) 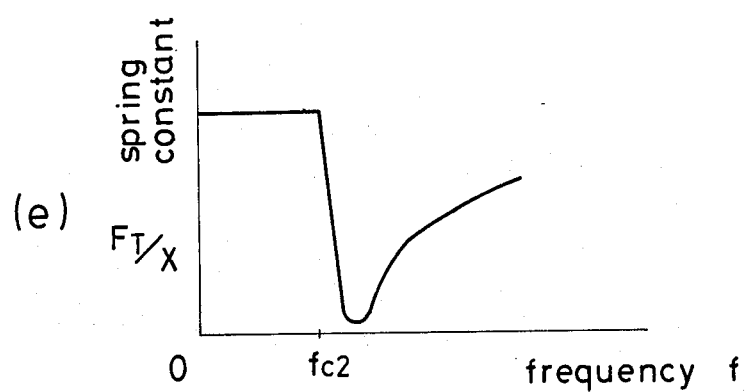

APPARATUS FOR MOUNTING POWER UNIT

FIELD OF THE INVENTION

The invention relates to an apparatus for resiliently supporting a power unit associated with a vehicle on a support, and more particularly, to an improvement of such appratus which includes a mass member interposed therein.

BACKGROUND OF THE INVENTION

A power unit as may be comprised of an engine and a variable speed transmission is resiliently mounted on a suspension member of a car body by using a main mounting apparatus and a buffer rod. The phase of oscillation of the buffer rod is reversed across a resonant frequency, and this fact is utilized to cause the buffer rod to serve as a dynamic damper through a suitable choice of the resonant frequency thereof, in an attempt to dampen the oscillations of a vehicle during its running and to prevent the occurrence of confined sounds of low frequencies.

However, because the buffer rod has a constant effective mass, an attempt to reduce the confined sounds results in excessively increasing the magnitude of the spring constant of the mounting apparatus in a range of frequencies which are just below the resonant frequency, thus rather degrading the damping characteristic of the power unit mounting apparatus.

The buffer rod consisting of a pair of elastic members and a mass member interposed therebetween exhibits good oscillation suppressing effects at frequencies above the resonant frequency thereof. However the buffer rod does not exhibit a good oscillation transmission rate for oscillations of frequencies which are just less than the resonant frequency of the elastic members.

Therefore, it is a first object of the invention to provide an apparatus for mounting a power unit which is capable of preventing oscillations of a car body when it is running at a medium speed by using the mass member having a first weight and also capable of preventing the occurrence of confined sounds when the vehicle is running at a high speed by using the mass member having a second weight, thus improving the anti-oscillation performance over the entire range of frequencies which practically occur as a result of running of the vehicle.

It is a second object of the invention to provide an apparatus for mounting a power unit which accommodates for a degradation in the oscillation transmission rate in a range of frequency below the resonant frequiency of the elastic members which have a mass member interposed therebetween, while taking advantage of a reduction in the transmission of oscillations in a range of frequencies above the resonant frequency.

SUMMARY OF THE INVENTION

It is a feature of the invention that an apparatus for mounting a power unit includes a main mounting construction which resiliently supports a power unit on a car body and which is connected in parallel with a fastening member which has its one end coupled to the power unit through an elastic member and which has its other end coupled to the car body through another elastic member. A weight is attached to the fastening member through a resilient member in a floating manner, and constraint means is provided which is capable of locking the weight to the fastening member.

It is another feature of the invention that a first elastic member and second elastic member having a mass member interposed therein are connected in parallel such that oscillations transmitted through the second resilient member may be partly or entirely uncoupled or coupled depending on the frequency of an input oscillation.

BRIEF DESCRIPTION OF THE DRAWINGS

FIG. 8 (a) is a graphically shows the relationship between the spring constant of the buffer rod and the frequency;

FIG. 8(b) graphically shows the relationship between the phase and the frequency;

FIG. 8(c) graphically shows the relationship between the spring constant of the main mounting construction and the frequency FIG. 8(d) graphically shows the relationship between the springs constant of the mounting apparatus and the frequency;

FIG. 8(e) graphically shows the relationship between the spring constant of the mounting apparatus and the frequency;

DESCRIPTION OF EMBODIMENTS

Figure 1:
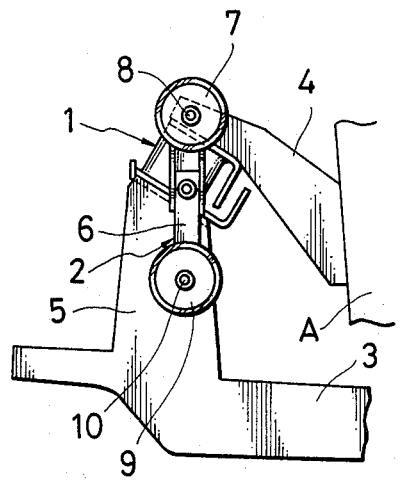
FIG. 1 is a schematic front elevation of a conventional construction for mounting a power unit.

Referring to FIG. 1, there is shown a power unit A which is disclosed in Japanese Publication of unexamined Patent Application No. 90,725/1981 which is resiliently mounted on a suspension member 3 of a car body by means of a main mounting construction 1 and buffer rod 2. The construction 1 is interposed between a bracket 4 secured to the power unit A and a support arm 5 of the suspension member 3. The buffer rod 2 includes a fastening member 6, one end of which is connected to the bracket 4 through an interposed elastic member 7, by means of a bolt 8, and the other end of which is coupled through an interposed elastic member 9 to the support are 5 by means of a bolt 10.

It is to be noted that the relationship between the phase and the frequency of oscillation applied to the buffer rod 2 is reversed across the rosonant frequency of the rod. Specifically, the phase in a range of frequencies above the resonant frequency is displaced 180° from the phase of oscillation in a range of lower frequencies. Accordingly, through a suitable choice of the effective mass of the buffer rod, or principally the mass of the fastening member 6, the resonant frequency of the buffer rod may be established to be slightly below a range of frequencies of so-called confined sounds generated, and the buffer rod 2 may be operated as a dynamic damper, whereby the oscillations trasmitted are damped by interference, thus preventing the occurrence of confined sounds of low frequencies which may be developed within a compartment of a vehicle when the latter is running at a high speed.

However, the effective mass of the buffer rod 2 remains constant and invariable with a power unit mounting construction of the prior art as described above. Accordingly, if a buffer rod 2 is chosen which is effective to reduce the confined sounds, there results an increase in the magnitude of the spring constant of the construction 1 in a range of frequencies just below the resonant frequency, rather degrading the damping characteristic of the mounting construction.

Figure 2:
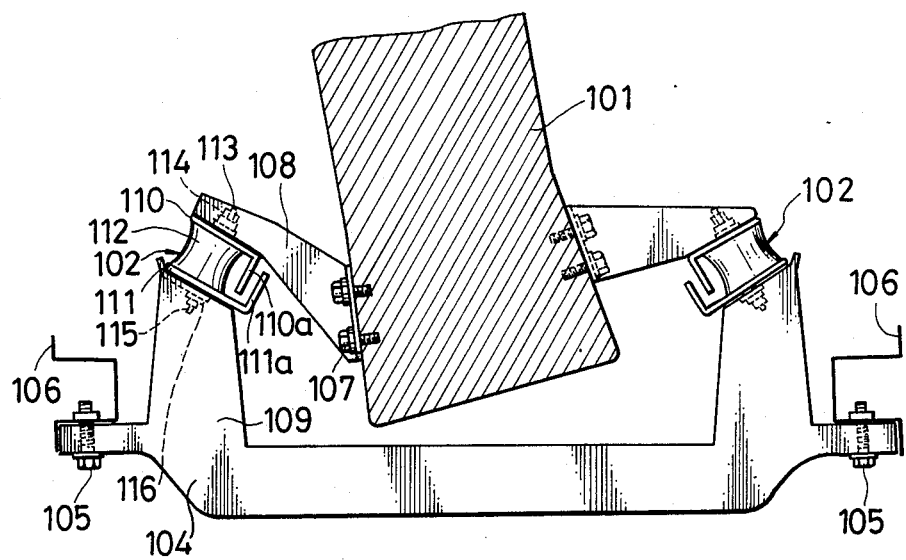
FIG. 2 is a front view of an apparatus for mounting a power unit according to the invention, with a buffer rod being omitted from illustration.

Referring to FIGS. 2 to 6, an embodiment of the invention will be described. A power unit 101 is resiliently supported on a suspension member 104 by utilizing a main mounting construction 102 and a buffer rod 103. The suspension member 104 is secured to a side member 106 by means of a bolt and nut arrangement 105. As shown in FIG. 2, the construction 102 is interposed between a bracket 108 secured to the power unit 101 by bolts 107 and a support arm 109 of the suspension member 104. Specifically, it comprises a top plate 110 having a stop 110a, a bottom plate 111 having a stop 111a, and an elastic member 112 formed of an elastomer which is vulcanized and adhesively connected between the both plates. A bolt 113 secured to the top plate 110 passes through the bracket 108 and is clamped thereto by a nut 114. A bolt 115 secured to the bottom plate 111 passes through the support arm 109 and is clamped thereto by a nut 116. It will be noted that a similar construction 102 is attached to the opposite side of the power unit 101 using similar fastening means.

Figure 3:
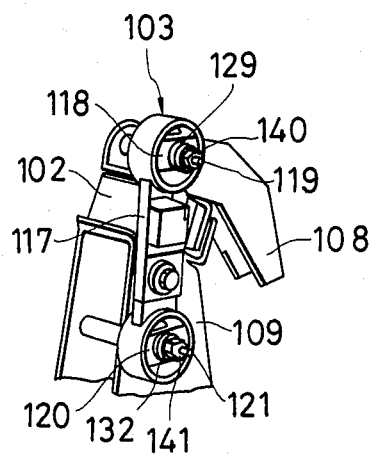
FIG. 3 is a perspective view of part of the apparatus shown in FIG. 2.
Figure 5:
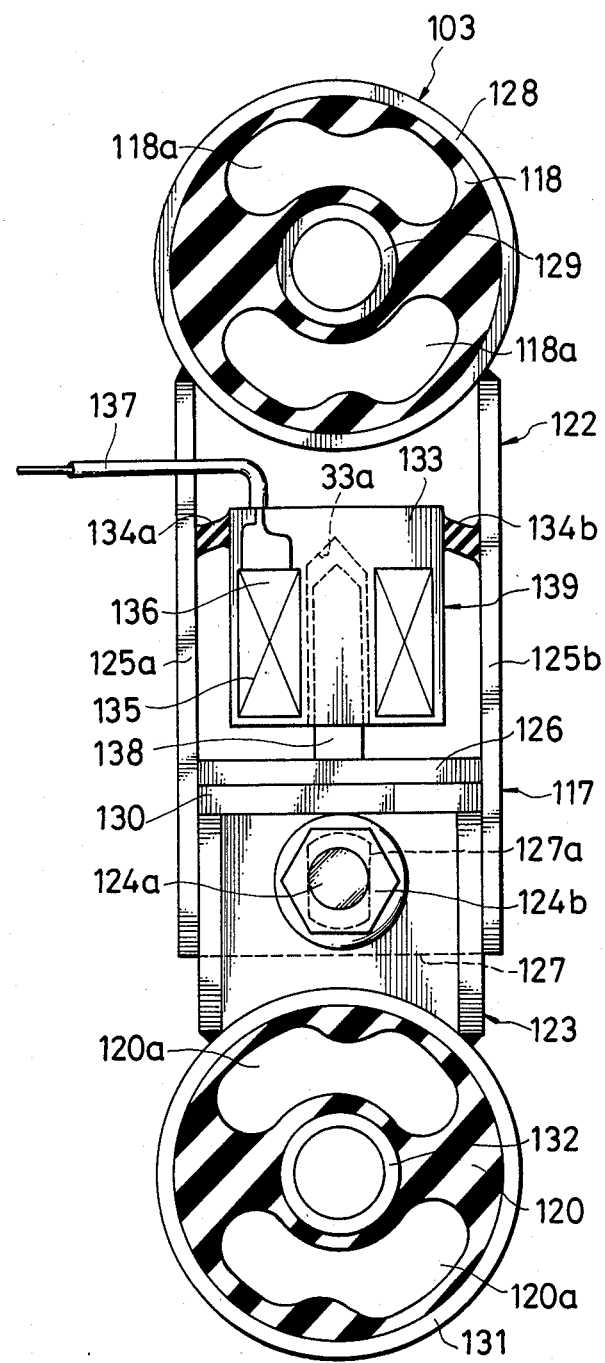
FIG. 5 is a front view of a buffer rod.
Figure 6:
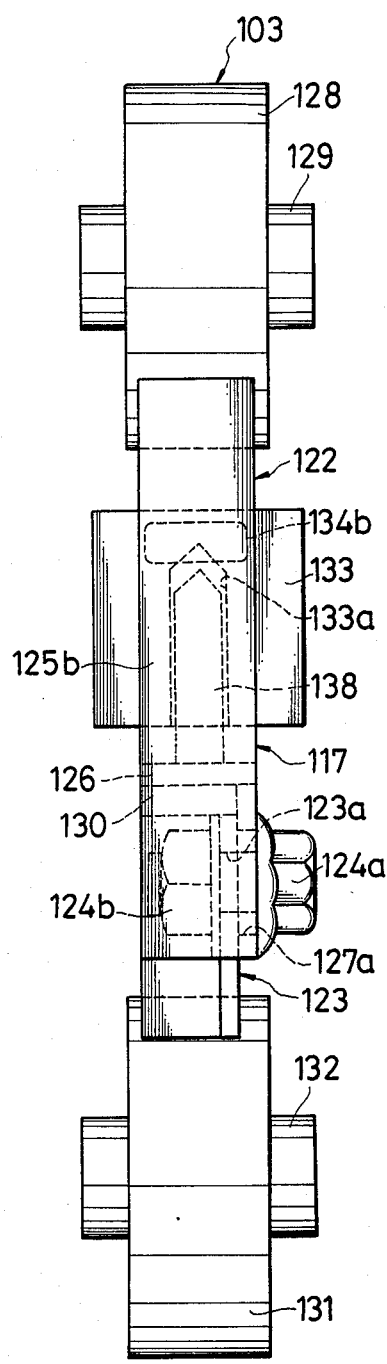
FIG. 6 is a side elevation of the buffer rod.

As shown in FIG. 3, the buffer rod 103 includes a fastening member 117, one end of which is coupled to the bracket 108 by a bolt 119, with an elastic member 118 interposed therebetween, and the other end of which is coupled to the support arm 109 of the suspension member 104 by a bolt 121, with an elastic member 120 interposed therebetween. The detailed construction of the buffer rod 103 is shown in FIGS. 5 and 6. Specifically, the fastening member 117 comprises a first section 122 located adjacent to the power unit and a second section 123 located adjacent to the car body, which are coupled together by a bolt 124. The first section 122 of the fastening member which is located adjacent to the power unit includes a pair of parallel sideplates 125a, 125b, which are connected together intermediate their lengths by a baseplate 126. A support plate 127 which is channel-shaped in section and having an elongated slot 127a therein is secured to the bottom of the base plate 126. An outer sleeve 128 is secured to the top ends of the both sideplates 125a, 125b by welding, and the elastic member 118 comprising an elastomer is disposed between the outer sleeve 128 and an inner sleeve 129, and is vulcanized in place and adhesively bonded thereto. The second section 123 of the fastening member which is located adjacent to the car body is also channel-shaped in section, and has a reinforcing plate 130 fixedly connected to one end thereof, and is formed with a through-opening 123a. An outer sleeve 131 is secured to the lower end of the second section of the fastening member 123, and the elastic member 120 comprising an elastomer is disposed between the outer sleeve 131 and an inner sleeve 1 is vulcanized in place and adhesively bonded thereto. Both elastic members 118, 120 have through-openings 118a, 120a which are provided to achieve a proper amount of reduction in the rigidity thereof.

During the assembly of the buffer rod 103, the second section 123 of the fastening member is disposed in overlapping relationship with the support plate 127 carried by the first section 122 so that the through-opening 123a in the second section 123 is aligned with the elognate slot 127a formed in the support plate 126 of the first section 122. The bolt 124a is passed through the opening 123a and the slot 127a, and these members are clamped together by a nut 124b, thus adjusting the mounting distance between the inner sleeves 129, 132 which depends on the variety of vehicles. An effective mass $M_1$ which principally comprises the mass of the fastening member 117 is combined with the elastic members 118, 120 which are disposed on the opposite sides thereof, and hence the buffer rod 103 functions as a dynamic damper.

A weight 133 having a mass $m_2$ is supported between the sideplates 125a, 125b of the first section 122 of the fastening member which is located adjacent to the power unit, in a floating manner, by means of elastic members 134a, 134b which may comprise elastomers, coiled springs, or the like. The weight 133 is formed with a longitudinal flute 133a, around which a solenoid 136 defining an electromagnet 135 is formed. The solenoid 136 is energized from an external source through lead wires 137. A stanchion 138 of a ferromagnetic material is fixedly mounted on the baseplate 126 and has its free end slidably fitted into the longitudinal flute 133a. The solenoid 136 constitutes constraint means 139 which attracts and secures the weight 133 to the stanchion 138 or releases it. When released, the weight 133 is floatingly movable in the vertical direction as guided by the stanchion 138.

Figure 4:
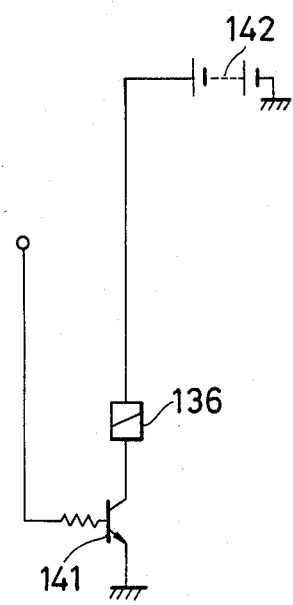
FIG. 4 is a circuit diagram of a control circuit of a solenoid.

FIG. 4 shows a control circuit for the solenoid 136. The circuit includes a transistor 141, to which a base current is applied when the engine of a vehicle rotates with a given number of revolutions, which may be equal to or exceed about 3,000 rpm, for example. The switching action of the transistor 141 feeds the solenoid 136 from a battery 142, whereby the weight 133 is attracted to the stanchion 138. Thereupon, the effective mass of the buffer rod 103 will be equal to $M_2 = M_1 + m_2$. Conversely, for a number of revolutions of the engine which is below about 3,000 rpm, the base current to the transistor 141 is interrupted, whereby the weight 133 remains floating as supported by the elastic members 134a, 134b. At this time, the effective mass of the buffer rod 103 is substantially equal to $M_1$.

When mounting such buffer rod 103 on the vehicle, the bolt 119 is passed through the bracket 108 and one of the inner sleeves 129, and is clamped by a nut 140 while the bolt 121 is passed through the support arm 109 and the other inner sleeve 132 and is clamped by a nut 141.

Figure 7:
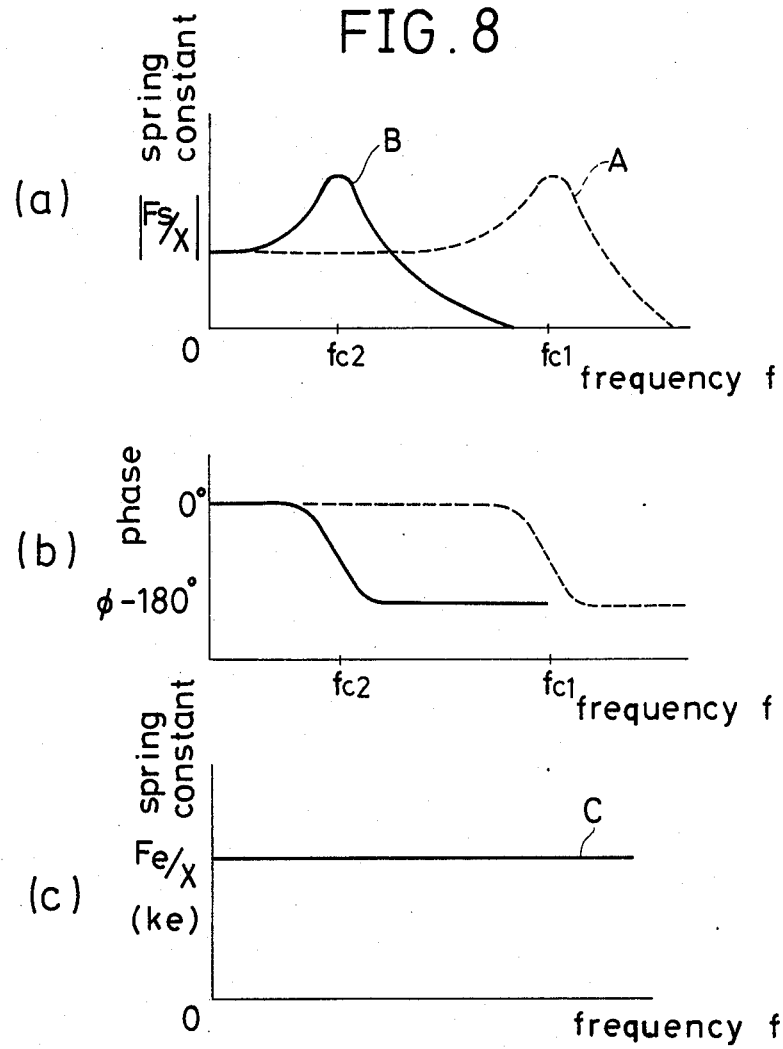
FIG. 7 shows a mechanical equivalent circuit of the buffer rod.

The operation of the apparatus will now be described. FIG. 7 shows an equivalent circuit of the buffer rod 103. As shown, it comprises a weight 142 having a mass M which is supported at its opposite ends by the elastic member 118, 120 having spring constant $k_1, k_2$. When the buffer rod 103 is excited by applying an oscillation having a displacement x and a frequency f to one end thereof, a force Fs is developed at the other end thereof, which is generally expressed as follows:

$$Fs = \frac{k_1 \cdot k_2}{(k_1 + k_2 - (2\pi f)^2 M)} \cdot X \quad (1)$$

Considering the attenuation by the elastomer which forms the elastic members 118, 120, the relationship between a spring constant $|Fs/x|$ and the frequency f is graphically shown in FIG. 8(a). A curve A represents such a relationship for an effective mass of the buffer rod 103 which is equal to a relatively low value $F_1$, and a curve B represents a corresponding relationship when a mass $m_2$ is added to the mass $M_1$ to provide a combined mass $M_2$. Representing the resonant frequency for the mass $M_1$ by fc1 and the resonant frequency for the mass $M_2$ by fc2, the spring constant $|Fs/x|$ will reach its maximum at the resonant frequencies fc1, fc2. The resonant frequency fc is a frequency which makes the denominator of the equation (1) equal to zero. Thus, $$fc = \frac{1}{2} \sqrt{\frac{K_1 + k_2}{M}} \quad (2)$$

It will be noted from FIG. 8(b) that the phase $\phi$ varies by 180° across each of the resonant frequencies fc1, fc2.

The frequency f and the spring constant $|Fe/x|$ of the construction 102 is related by the equation $Fe = -ke \cdot x$, if the attenuation by the elastic members is neglected. Thus, it is graphically indicated by a straight line C shown in FIG. 8(c), and the spring constant Fe/x remains substantially constant and is independent from the frequency f.

Accordingly, if the construction 102 and the buffer rod 103 having such characteristics are connected in parallel with each other, the relationship between the spring constant $F_T/x$ and the frequency f will be as graphically shown in FIG. 8(d). In this Figure, a curve D represents a combination of the curves A and C and corresponds to the effective mass $M_1$ of the buffer rod 103, and a curve E represents a combination of the curves B and C and correspoonds to the effective mass $M_2$ of the buffer rod 103. In a range of frequencies which are lower than the resonant frequencies fc1, fc2 of the buffer rod 103, forces from the power unit 101 are transmitted to the suspension member 104 as sum of the absolute value of a force (Fe) which is transmitted through the construction 102 and the absolute value of a force (Fs) which is transmitted through the buffer rod 103. On the other hand, in a range of higher frequencies, such forces produce an interference therebetween, and are transmitted as a difference between the absolute values of Fe and Fs.

Accordingly, if the elastic modulii $k_1, k_2$ of the elastic members 118, 120 of the buffer rod 103 are chosen to establish a value for the mass $M_2$ which brings the corresponding resonant frequency fc2 to a point slightly less than a range of frequencies of confined sounds generated when the solenoid 136 is turned on, the occurrence of confined sounds can be eliminated for practical purposes in a range of frequencies higher than the frequency range of confined sounds, for example, from 70 to 120 Hz, as compared to the use of the mounting construction alone. However, in a range of medium frequencies H which are below the resonant frequency fc2 of the buffer rod 103, the magnitude of the spring constant $F_T/x$ of the mounting apparatus will increase to improve the vibrational resistance, but the anti-oscillation performance will degraded, resulting in an undesirable effect that the oscillations of the car body will even increase. To accommodate for this, the solenoid 136 of the electromagnet 135 is not energized and the weight 133 is left floating until a frequency is reached which is slightly greater than the resonant frequency fc2, for example, a number of revolutions of about 3,000 rpm or in a range from 2,400 to 4,000 rpm for a four cylinder engine vehicle. This reduces the effective mass of the buffer rod 103 to a value $M_1$, and hence the resonant frequency fc1 increases to a value equal to or greater than 180 Hz, for example. This means that the curve E is replaced by the curve D. In a region of frequencies which are slightly higher than the resonant frequency fc2 of 70 to 120 Hz, for example, the electromagnet 135 is energized to increase the effective mass of the buffer rod 103 to a value $M_2$. This makes the spring constant represented by the curve E to be effective, producing an interference effect.

The power unit mounting apparatus described above has a relationship between the effective spring constant $F_t/x$ and the frequency of which is illustrated by a solid line curve in FIG. 8(e), indicating that the occurrence of confined sounds when the vehicle is running at its high speed can be effectively suppressed while providing a substantially constant, stabilized value of spring constant $F_T/x$ in the medium frequency range H to suppress the oscillations of the car body. As a consequence, the values of the spring constants $k_1, k_2$ of the elastic members 118, 120 of the buffer rod 103 may be increased to 3 to 15 kg/mm, for example, for each member and the spring constant ke of the construction 102 can be reduced, thus enabling the anti-oscillation performance of the mounting apparatus to be improved without degrading the vibrational resistance.

Figure 9:
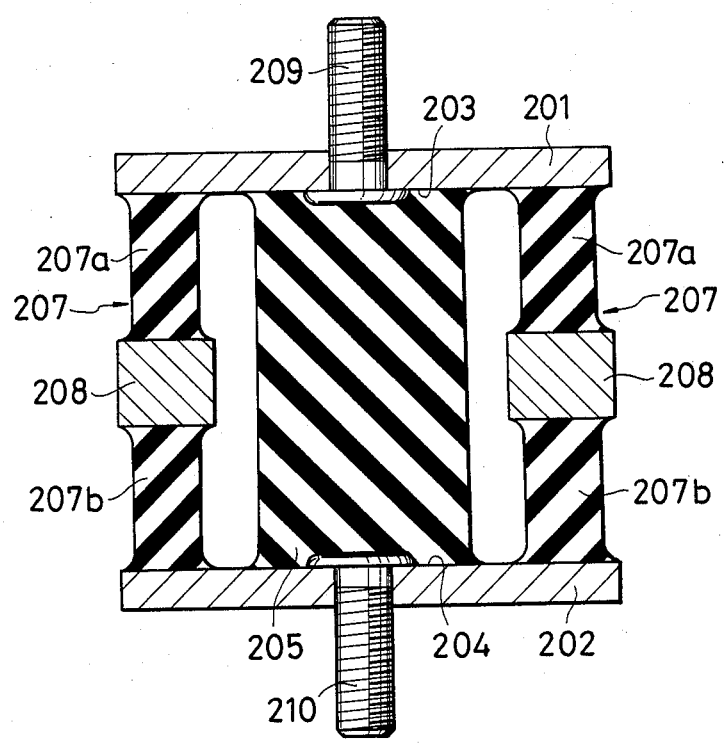
FIG. 9 is a side elevation, partly in section, of a conventional apparatus for mounting a power unit.

An actual construction corresponding to the mechanical model shown in FIG. 7 and comprising a mass member interposed between a pair of rubber-like elastic members is disclosed in Japanese Publication of Unexamined Utility Model Application No. 7,945/1983. Such apparatus will be described with reference to FIG. 9. The apparatus includes a pair of frame sections 201, 202 having opposing walls 203, 204, to which the opposite ends of rubber-like elastic members 205, 207 are secured, the elastic members being disposed in parallel relationship with each other. Each of the rubber-like elastic members 207 comprises a pair of rubber-like elastic elements 207a, 207b which are connected together by a mass member 208 interposed therebetween. The frame sections 201, 202 are attached to a power unit or a support arm, respectively, by means of mounting bolts 209 and 210, respectively.

Figure 10:
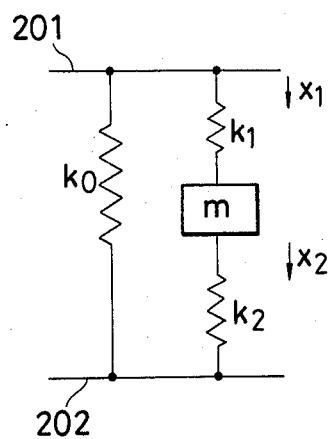
FIG. 10 shows a mechanical equivalent circuit of the apparatus shown in FIG. 9.

The mechanical model of the described apparatus is shown by an equivalent circuit of FIG. 10. As shown, the frame section 201 is attached to the power unit while the frame section 202 is attached to the support arm.

The rubber-like elastic member 205 has a spring constant $k_0$, and the rubber-like elastic elements 207a, 207b have spring constants $k_1, k_2$, respectively, and the mass member 208 has a mass m. Representing a displacement of the frame section 201 relative to the frame section 202 by $x_1$ and a displacement of the mass member 208 relative to the frame section 202 by $x_2$, a force F which is transmitted from the frame section 201 to the frame section 202 can be expressed as follows:

$$F = k_0 x_1 + k_2 x_2$$

Figure 11:
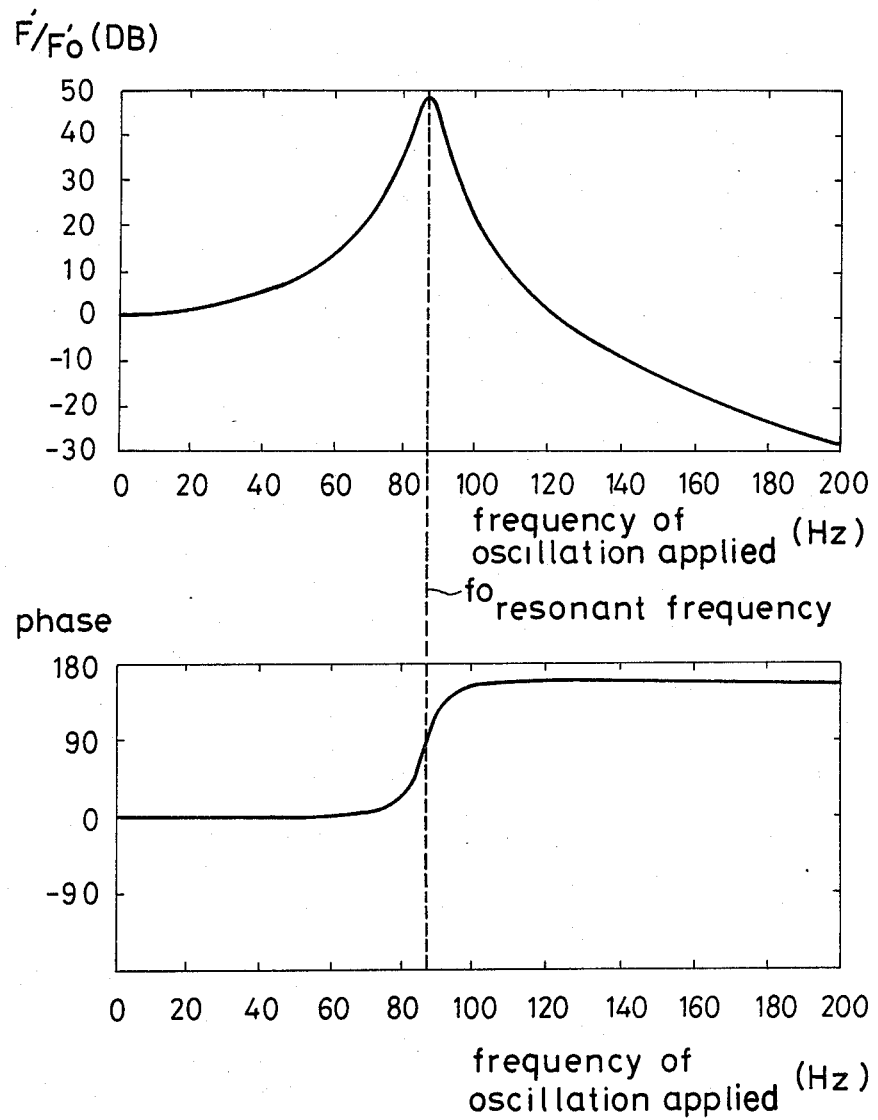
FIG. 11 graphically shows the response of the arrangement illustrated in FIG. 10.
Figure 12:
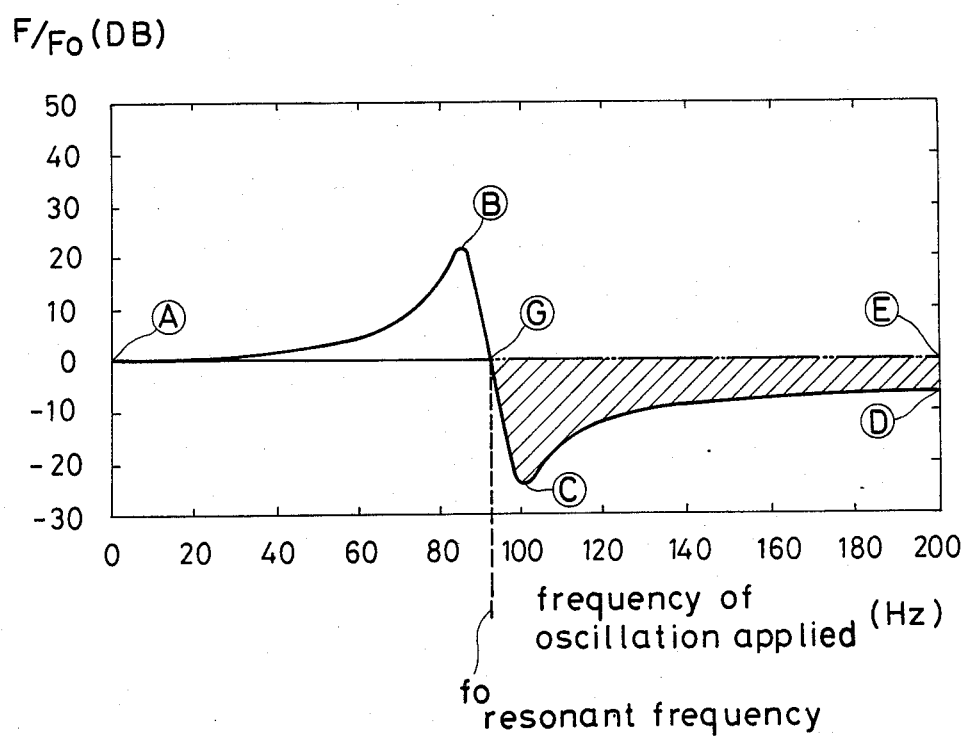
FIG. 12 graphically shows the responses of the mounting apparatus shown in FIG. 9 and an appratus according to the invention.

A force which is transmitted from the mass member 208 to the frame section 202 when the frequency of the oscillation applied is equal to zero is represented by $F_0'$. A force is transmitted from the member 208 to the section 202 is represented by $F'$ the fraction 201 is excited with an oscillation of a certain. When frequency. The oscillation transmission rate is equal to $20 \log F'/F_0'$ as is graphically shown in FIG. 11. As shown, it is noted that the magnitude of the oscillation transmitted to the frame section 202 is at its maximum at the resonant frequency fo of the rubber-like elastic member 207. It is also noted that the phase of oscillation is reversed across the resonant frequency $f_0$. Accordingly, in an arrangement of FIG. 10 which is equivalent to the mechanical model shown in FIG. 7 added with a spring $K_0$ connected in parallel with the spring system of the model, the term $k_2 x_2$ in the equation $F = k_0 x_1 + k_2 x_2$ has a positive value when the frequency of the force of the oscillation applied to the frame section 201 is less than the resonant frequency $f_0$ of the rubber-like elastic member 207, but has a negative value when the frequency of oscillation is greater than the resonant frequency $f_0$. Accordingly, representing a force which is transmitted from the frame section 201 to the frame section 202 when the frequency of the oscillation applied is equal to zero by $F_0$ and a force which is transmitted to the frame section 202 when the frame section 201 is excited with an oscillation of a certain frequency by F, the oscillation transmission rate which is equal to $20 \log F/F_0$ is graphically shown in FIG. 12 as a curve which passes through points A, B, G, C and D. The oscillation transmission rate when the rubber-like elastic member 205 alone is used will be represented by a curve which passes through points A, G and E. It will therefore be seen that when the frequency of oscillation applied to the frame section 201 exceeds $f_0$, the magnitude of the oscillation transmission rate is reduced by an amount which is indicated in FIG. 12 by a hatched area. Thus, it follows that by establishing the resonant frequency $f_0$ of the rubber-like elastic member 207 which is just less than the frequencies of oscillations which would present a problem in the power unit that is to be supported by the mounting apparatus, it is possible to reduce effectively the transmission of oscillations in a range of frequencies which present a problem in the power unit.

However, with the mounting apparatus as described above, the oscillation transmission rate will be degraded, as illustrated by points A, B and G in FIG. 12, for oscillations of frequencies which are less than the resonant frequency of the elastic member which includes an interposed mass member. In particular, the transmission rate is significantly degraded just below the resonant frequency.

Figure 13:
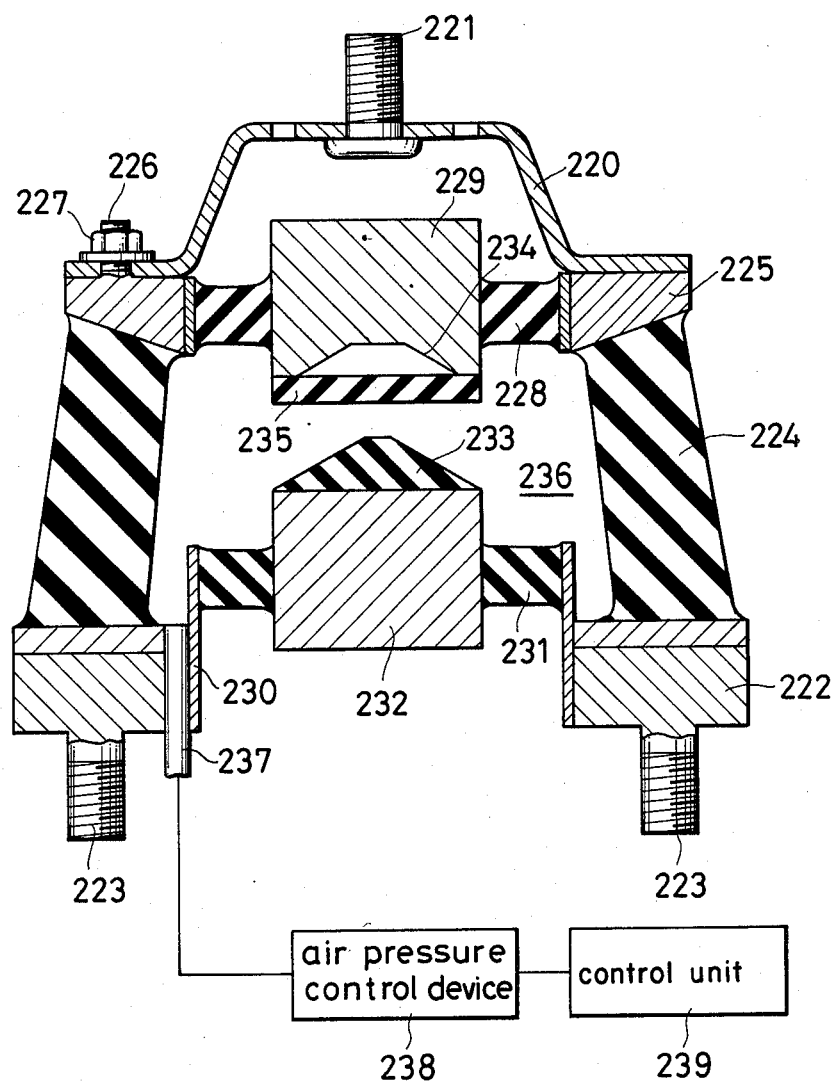
FIG. 13 is a cross section of an apparatus for mounting a power unit according to another embodiment of the invention.

FIG. 13 shows an apparatus for mounting a power unit according to another embodiment of the invention. A mounting member 220 is attached to a power unit, not shown, by a bolt 221. Another mounting member 222 is attached to a car body by a bolts 223. The apparatus includes a first elastic member 224 which has its lower end bonded to the mounting member 222 by a vulcanizing bonding process and which has its upper end bonded to a connecting frame 225 by a vulcanizing bonding process. The mounting member 220 is connected to the connecting frame 225 by means of bolts 226 and nuts 27. A mass member 229 is connected to the connecting frame 225 through a rubber-like elastic member 228 which represents a second elastic member while another mass member 232 is connected through a rubber-like elastic member 231, which also represents a second elastic member, to a frame 230 which is in turn connected to the mounting member 222. A rubber-like elastic member 233 having a chevron-shaped configuration and serving as a buffer is fixedly mounted on top of the mass member 232 while a recess 234 of a conforming configuration is formed in the opposing surface of the mass member 229. A rubber-like elastic member 235 serving as a buffer is fixedly connected to the mass member so as to cover the recess 234. In this manner, a space is enclosed by the mounting member 222, the elastic member 224, the connecting frame 225, the elastic member 228, the mass member 229, the elastic member 231 and the mass member 232 to define an air chamber 236 which is connected through a channel 237 to an air pressure control device 238 which is in turn connected to a control unit 239. Thus, the control unit 239 may be operated to cause the air chamber 236 to communicate with the atmosphere or to a negative pressure. It will be appreciated that all of these members form means which uncouple either partly or entirely an oscillation transmitting function which passes through the second elastic member to the mounting member associated with the support arm.

The operation of the mounting apparatus will now be described. FIG. 13 illustrates a condition of the apparatus when the air chamber 236 is communicated with the atmosphere. At this time, oscillations from the power unit are transmitted to the support are only through a path including the first electric member 224. If the air pressure control device 238 is now operated to reduce the pressure within the air chamber 236, the mass members 229, 232 are integrally coupled together with the buffer member 233, 235 interposed therebetween under the action of the atmospheric pressure. Oscillations are then transmitted from the mounting member 220 associated with the power unit to the mounting member 222 associated with the support arm through two paths, one path including the first elastic member 224 and the second path extending through the elastic member 228 and the mass member 229, 232 to the elastic member 231. Since it may be considered that the buffer members 233, 235 have greater values of spring constants than the elastic members 228, 231, the mass members 229, 232 may be treated as an integral member. The elastic members 228, 231, the mass members 229, 232 and the buffer members 233, 235 then function as the second elastic member. Thus it follows that the general arrangement is a parallel combination of a spring which comprises the rubber-like elastic member and another spring which comprises a rubber-like elastic member having a mass member interposed therein, as in the arrangement described above in connection with FIG. 9.

The control of the pressure within the air chamber 236 which is achieved by operating the air pressure control device 238 takes place in consideration of the application of the mounting apparatus. By way of example, if the mounting apparatus is used with a 4 cycle 4-cylinder engine, secondary components of rotation of the engine will be a principal cause of noises and oscillations. Hence, the air pressure control device 238 is operated to allow the air chamber 236 to communicate with the atmosphere when the frequencies of such secondary components of rotation of the engine are less than the resonant frequency of the second elastic members 228, 231, 229, 232, 233 and 235 provided that the mass members 229, 232 are coupled together in an integral manner. On the contrary, when the frequencies of the secondary components exceed the resonant frequency, the pressure within the air chamber 236 is reduced to couple the mass members 229 and 232 together in an integral manner. If it is assumed that the resonant frequency of the second elastic member as it is integrally coupled together is equal to $f_0$ shown in FIG. 12, the operating characteristic of the mounting apparatus will be indicated by a curve passing through the points A, G, C and D shown in FIG. 12, thus achieving an improvement over the operation of the mounting apparatus shown in FIG. 9 in the region including the points A, B and G shown in FIG. 12.

Figure 14:
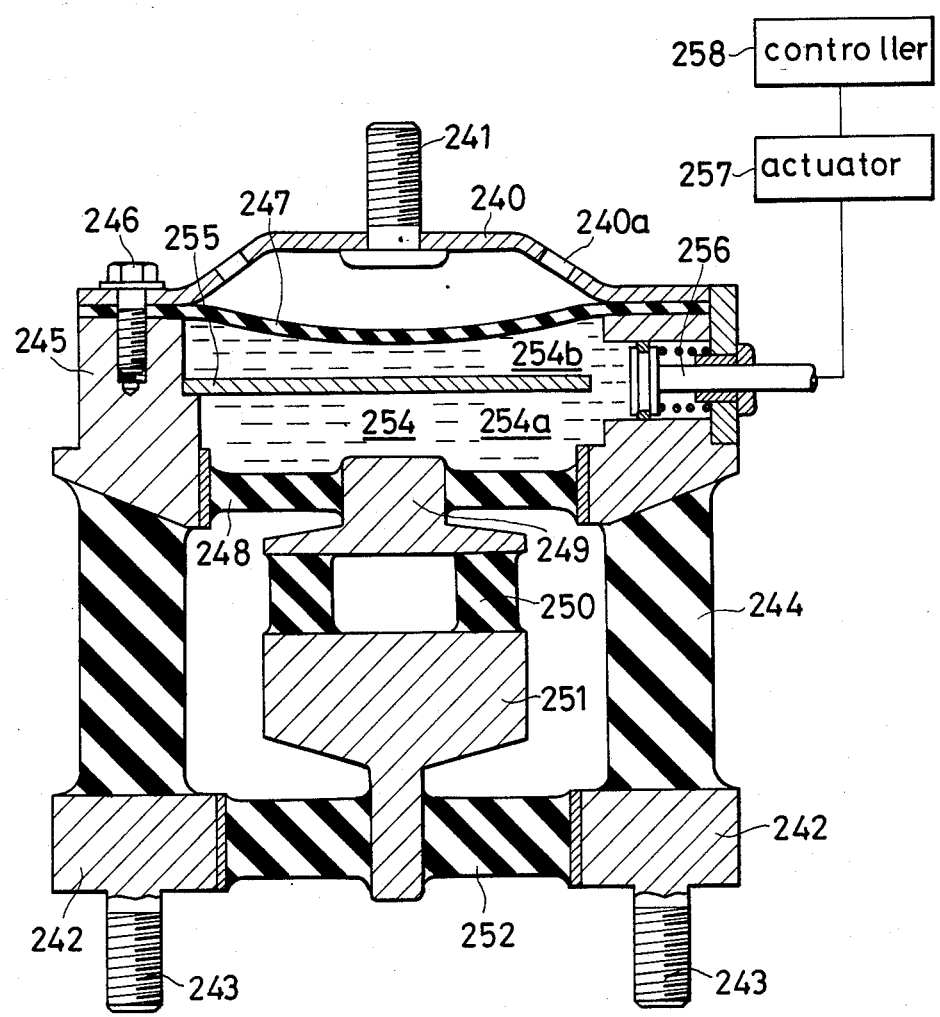
FIG. 14 is a cross section of a further embodiment of the invention.

FIG. 14 shows an apparatus for mounting a power unit according to a further embodiment of the invention. While a pair of mass members are coupled together or uncoupled from each other in response to an air pressure in the embodiment of FIG. 13, the embodiment of FIG. 14 enables the transmission of oscillations between a second elastic member comprising a single mass member and a mounting member associated with a power unit to be coupled or uncoupled through a liquid and a valve.

Referring to FIG. 14, a mounting member 240 is attached to a power unit, not shown, by a bolt 241. On the other hand, a mounting member 242 is attached to a car body, not shown, by bolts 243. The apparatus includes a first elastic member 244 which has its lower end bonded to the mounting member 242 associated with the car body by vulcanizing bonding process while its other end is bonded to a connecting frame 245 by vulcanizing bonding process. The connecting frame 245 is connected to the mounting member 240 associated with the power unit by a bolt 246, with an end of a diaphragm 247 being interposed between the mounting member 240 and the frame 245. An auxiliary member 249 is connected to the connecting frame 245 through a rubber-like elastic member 248 interposed therebetween, and a mass member 251 has its one end connected to the auxiliary member 249 with a rubber-like elastic member 250 interposed therebetween. The other end of the mass member 251 is connected to the mounting member 242 associated with the support arm with a rubber-like elastic member 252 interposed therebetween. A combination of the elastic member 248, the auxiliary member 249, the elastic member 250, the mass member 251 and the elastic member 252 forms together a second elastic member. The frame 245, the elastic member 248, the auxiliary member 249 and the diaphragm 247 enclose a space which defines a liquid chamber 254, which is divided by a partition 255 into a pair of liquid compartments 254a, 254b, a comunication therebetween being controlled by a valve 256 which is disposed in the connecting frame 245. The valve 256 may be opened or closed by an actuator 257 which is in turn controlled by a controller 258. Any of pneumatic, hydraulic actuators and electromagnetic solenoids may be used for the actuator 257. The other side of the diaphragm 247 which is opposite from the liquid chamber 254 communicates with the atmosphere through openings 240a which are formed in the mounting 240. In operation, when the valve 256 is open as shown in FIG. 14, a communication between the compartments 254a 254b which are divided by the partition 255 is established, and the liquid chamber 254a communicates with the atmospheric pressure. At this time, there occurs no change in the pressure within the liquid chamber 254 if oscillations are transmitted to the mounting member 240 from a power unit, not shown. consequently, oscillations from the power unit which are to be transmitted through the second elastic member comprising the members 248, 249, 250, 251 and 252 will be transmitted only through the connecting frame 245 and the rubber-like elastic member 248. Hence, if the elastic member 248 is made to have a spring constant in the direction of oscillations of the power unit which is small enough to minimize the transmission of oscillations therethrough, oscillations from the power unit will in its majority be transmitted through the first elastic member 244 which does not include a mass member therein.

If the actuator 257 is now operated to cause the valve 256 to close against the partition 255 to interrupt a communication between the compartments 254a, 254b, oscillations from the power unit which are transmitted to the mounting member 240 will be transmitted from the connecting frame 245 through the liquid chamber 254a to the elastic member 248 and the auxiliary member 249, whereby the mounting member 240 associated with the power unit, the connecting frame 245, the liquid chamber 254a, the elastic member 248 and the auxiliary member 249 move Integrally. Hence, oscillations will be transmitted from the mounting member 240 to the mounting member 242 through a path including the first elastic member 244 and also through another path including the second elastic member which comprises the members 248, 249, 250, 251 and 252 and including the mass member 251 therein. Thus, when the valve 256 is open, oscillations are transmitted through a path including only the rubber-like elastic member while when the valve 256 is closed, the path of transmission includes a spring comprising the rubber like elastic member alone, and another spring comprising the rubber-like elastic member having the mass member interposed therein, which are connected in parallel to each other.

A control performed by the valve 256 under the direction of the actuator 257 may be performed in the similar manner as before. By way of example, when the mounting apparatus is used with a 4 cycle 4-cylinder engine, secondary components of rotation of the engine will be a principal cause of noises and oscillations, and the controller 258 is operated in accordance with the number of revolutions of the engine. Thus, the actuator 257 issues a command to open the valve 256 when the frequencies of such secondary components of rotation of the engine are less than the resonant frequency of the members 249, 250 and 251 of the second elastic member, and when the frequencies of secondary components exceed the resonant frequency, the actuator 257 issues another command which closes the valve 256. If it is assumed that the resonant frequency mentioned above is equal to $f_0$ shown in FIG. 12, the operating characteristic of the mounting apparatus according to this embodiment will be indicated by a curve passing through the points A, G, C and D shown in FIG. 12, as with the previous embodiment, and hence, similar effects are achieved as with the previous embodiment.

It will be understood from the foregoing that in the apparatus of the invention, only that aspect of the elastic member containing a mass member therein and which achieves an enhanced oscillation suppressing effect can be utilized to advantage. Accordingly, a degradation in the oscillation transmission rate is avoided at frequencies below the resonant frequency of the second elastic member. At frequencies above the resonant frequency of the second elastic member, the effect of the elastic member containing the mass member therein which reduces the transmission of oscillations can be utilized. As a result, when such mounting apparatus is used in an automobile, transmission of noises and oscillations from the power unit can be reduced as experienced within a compartment of the automobile, improving the riding comfort. When the number of revolutions of the engines increases beyond a given value, the parallel combination of the first and the second elastic member increases the magnitude of the spring constant, advantageously preventing an oscillation of the engine as the automobile is running.

While the invention has been shown and described in detail in connection with certain embodiments thereof, it shoud be understood that a number of changes, modifications and substitutions therein will readily occur to one skilled in the art. By way of example, the constraint means 139 shown in FIG. 5 may comprise a hydraulically operated piston having a piston rod which is engaged with a weight 133 to constrain its movement. Alternatively, in the embodiment of FIG. 14, instead of connecting the mounting member 240 to the power unit and connecting the mounting member 242 to the support arm, a reverse arrangement may be used.

What is claimed is:

1. An apparatus for mounting a power unit to a vehicle comprising a first elastic member for a first force transmission line comprising a rubber-like elastic member and a second elastic member for a second force transmission line comprising rubber-like members and a mass member disposed between said rubber-like members, said first and second force transmission lines arranged functionally substantially parallel to each other, and said second elastic member having a means for engaging and disengaging at least part of said mass member with and from said force transmission line of said second elastic member.

2. The apparatus of claim 1, wherein said mass member comprises a first mass portion and a second mass portion engagable with said first mass portion so as to have a first weight so that said apparatus has a moderate first spring constant or moderate first oscillation transmission rate when the oscillation received by said apparatus has a frequency below the resonant frequency of said second elastic member and a second weight so that said apparatus has a lower second spring constant or lower second vibration transmission rate when the vibration received by said apparatus has a frequency above the resonant frequency of said second elastic member.

3. The apparatus of claim 2, wherein said lower second oscillation transmission rate is obtained by the interference due to phase difference in oscillation transmission between said first and second elastic members.

4. The apparatus of claim 1, wherein said first elastic member is a main mounting construction and said second elastic member is a buffer rod.

5. The apparatus of claim 4, wherein said buffer rod comprises first and second bracket means including an elastic member therein, a fastening member interposed between said first and second bracket means, and a mass means arranged in said fastening member and comprising a solenoid means producing electromagnetic forces and a stanchion of a ferromagnetic material connected to said fastening member, said solenoid means being adapted to be attracted and secured to said stanchion during its operation, and said solenoid means being kept in floating over said stanchion with a clearance therebetween when the solenoid is not operated.

6. The apparatus of claim 5, wherein a main mounting construction resiliently supports a power unit on a car body, and a fastening member is disposed in parallel relationship with the main mounting construction and with its one end fastened to the power unit through an elastic member and with its other end fastened to the car body through another elastic member; and a weight is coupled through an elastic member to the fastening member in a floating manner, there being provided constraint means which can secure the weight to the fastening member.

7. The apparatus of claim 1, wherein said second elastic member is functionally releasably connected to said first elastic member such that when said second elastic member is engaged which said first elastic member, forces are transmitted through said first and second elastic members and when said second elastic member is disengaged from said first elastic member, forces are transmitted through said first elastic member only.

8. The apparatus of claim 7, wherein said second elastic member is separated from said first elastic member having a moderate first spring constant or moderate oscillation transmission rate when the oscillation received has frequency below the resonant frequency of said second elastic member and connected to said first elastic member to produce a lower second spring constant or lower oscillation transmission rate when the oscillation received has a frequency above the resonant frequency of said second elastic member.

9. The apparatus of claim 7, wherein said lower second vibration transmission rate is obtained by the interference due to phase difference in oscillation transmission between said first and second elastic members.

10. The apparatus of claim 7, wherein said second elastic member comprises two separate portions which can be integrally joined.

11. The apparatus of claim 10, wherein said first elastic member is bonded to a mounting member and to a connecting frame, and said second elastic member has a first portion connected to said connecting frame through a first rubber-like elastic portion and a second portion connected to said mounting member through a second rubber-like elastic portion, and said first and second portions are integrally joined by an air pressure control device to change a pressure in an enclosed space defined by said first and second portions and said first and second elastic portions.

12. The apparatus of claim 7, wherein said second elastic member has a portion comprising a liquid chamber and an elastic portion at the bottom of said liquid chamber the spring constant of which is selected to minimize the transmission of oscillation therethrough and said liquid chamber being controlled in pressure therein.

13. The apparatus of claim 12, wherein said first elastic member bonded to a mounting member and to a connecting frame so as to transmit oscillation therebetween, said second elastic member comprises a first elastic portion connected to said frame member, a second elastic portion connected to said mounting member and a mass member portion therebetween, said first elastic portion partly defining a liquid chamber thereabove, and a partition within said liquid chamber such that when said partition devides said liquid chamber into upper and lower portions, the lower portion is isolated from the atmospheric pressure so that oscillations are transmitted from said connecting frame through said liquid chamber to said first elastic portion and that when said partition communicates said upper portion with said lower portion, said lower portion is subject to the atmospheric pressure so that oscillations are prevented from being transmitted through said first elastic portion.

14. The apparatus of claim 7. wherein said first elastic member is disposed between a mounting member associated with a power unit and another mounting member associated with a car body, and a second elastic member containing a mass member therein is disposed in parallel relationship with the first elastic member, and means is associated with said second elastic member for partly or entirely uncoupling and coupling an oscillation transmitting path from the mounting member associated with the power unit through the second elastic member to the mounting member associated with the car body.

* * * * *